US006594730B1

(12) United States Patent
Hum et al.

(10) Patent No.: US 6,594,730 B1
(45) Date of Patent: Jul. 15, 2003

(54) PREFETCH SYSTEM FOR MEMORY CONTROLLER

(75) Inventors: Herbert H J Hum, Portland, OR (US); Andrew V. Anderson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/365,851

(22) Filed: Aug. 3, 1999

(51) Int. Cl.[7] .............................................. G06F 13/00
(52) U.S. Cl. ..................... 711/137; 711/118; 711/154; 711/204; 711/213; 712/207; 712/237
(58) Field of Search ................................ 711/137, 118, 711/154, 213, 204; 712/207, 237, 238, 239

(56) References Cited

U.S. PATENT DOCUMENTS

| 5,586,294 A | | 12/1996 | Goodwin et al. | |
|---|---|---|---|---|
| 5,652,858 A | * | 7/1997 | Okada et al. | 711/137 |
| 5,701,426 A | | 12/1997 | Ryan | |
| 5,740,399 A | | 4/1998 | Mayfield et al. | |
| 5,745,732 A | * | 4/1998 | Cherukuri et al. | 711/168 |
| 5,761,706 A | | 6/1998 | Kessler et al. | |
| 5,933,616 A | * | 8/1999 | Pecone et al. | 710/129 |
| 5,958,040 A | * | 9/1999 | Jouppi | 712/207 |
| 6,085,263 A | * | 7/2000 | Sharma et al. | 710/56 |
| 6,085,291 A | * | 7/2000 | Hicks et al. | 711/137 |
| 6,145,062 A | * | 11/2000 | Chittor et al. | 711/154 |
| 6,148,350 A | * | 11/2000 | Chen et al. | 710/62 |
| 6,216,208 B1 | * | 4/2001 | Greiner et al. | 711/137 |

OTHER PUBLICATIONS

Palacharla, S., et al, "Evaluating Stream Buffers as a Secondary Cache Replacement" *IEEE*, 1063–6897/94, pp. 24–33.

Jouppi, Norman, et al, "Tradeoffs in Two–Level On–Chip Caching", *IEEE*, 1063–6897/94, pp. 34–45.

\* cited by examiner

*Primary Examiner*—Reginald G. Bragdon
*Assistant Examiner*—Jasmine Song
(74) *Attorney, Agent, or Firm*—Kenyon & Kenyon

(57) ABSTRACT

An embodiment of the present invention provides a memory controller that includes a plurality of transaction queues and an arbiter, a prefetch cache in communication with the arbiter, and a prefetch queue in communication with the prefetch cache. The prefetch queue also may be provided in communication with each of the transaction queues for the purpose of determining whether the transaction queues are operating in a congested state.

39 Claims, 6 Drawing Sheets

100

400

PREFETCH SYSTEM FOR MEMORY CONTROLLER

BACKGROUND

The present invention relates to a prefetch queue for use in a memory controller chipset.

As is known, modern computer systems may include a memory controller that controls access of other agents, such as microprocessors or peripheral components, to system memory. The memory controller may communicate with the other agents via one or more communication buses. Different bus protocols may be used for the different buses.

A memory controller is a transaction processing system that typically interfaces to a memory array. The memory array includes a plurality of memory entries that store data. The transaction controller receives requests for data operations that are posted on one or more communication buses, determines which can be satisfied from the memory array and performs the data requests. Data requests include requests from an agent for data to be read from or written to the memory array.

Memory arrays are bandwidth limited. The bandwidth limitation constrains the rate at which data may be read from the array to an agent in response to a transaction request. The memory array introduces undesirable latency to such requests. Accordingly, there is a need in the art for a memory control system that reduces latency of read requests posted to memory arrays.

SUMMARY

An embodiment of the present invention provides a memory controller that includes an arbiter, a prefetch cache in communication with the arbiter, and a prefetch queue in communication with the prefetch cache.

DETAILED DESCRIPTION

The present invention provides a prefetch mechanism in a memory controller. The inventors of the present invention noticed a trend in certain computer systems in which agents would post data transactions in bursts rather than at a steady state. Although, during bursty periods the bandwidth of the memory array may be operating in a congested state, during "lulls" between bursts, the memory array may operate in a lightly congested state. During these lightly congested periods, excess bandwidth of the memory array may be used beneficially.

Figure 1:
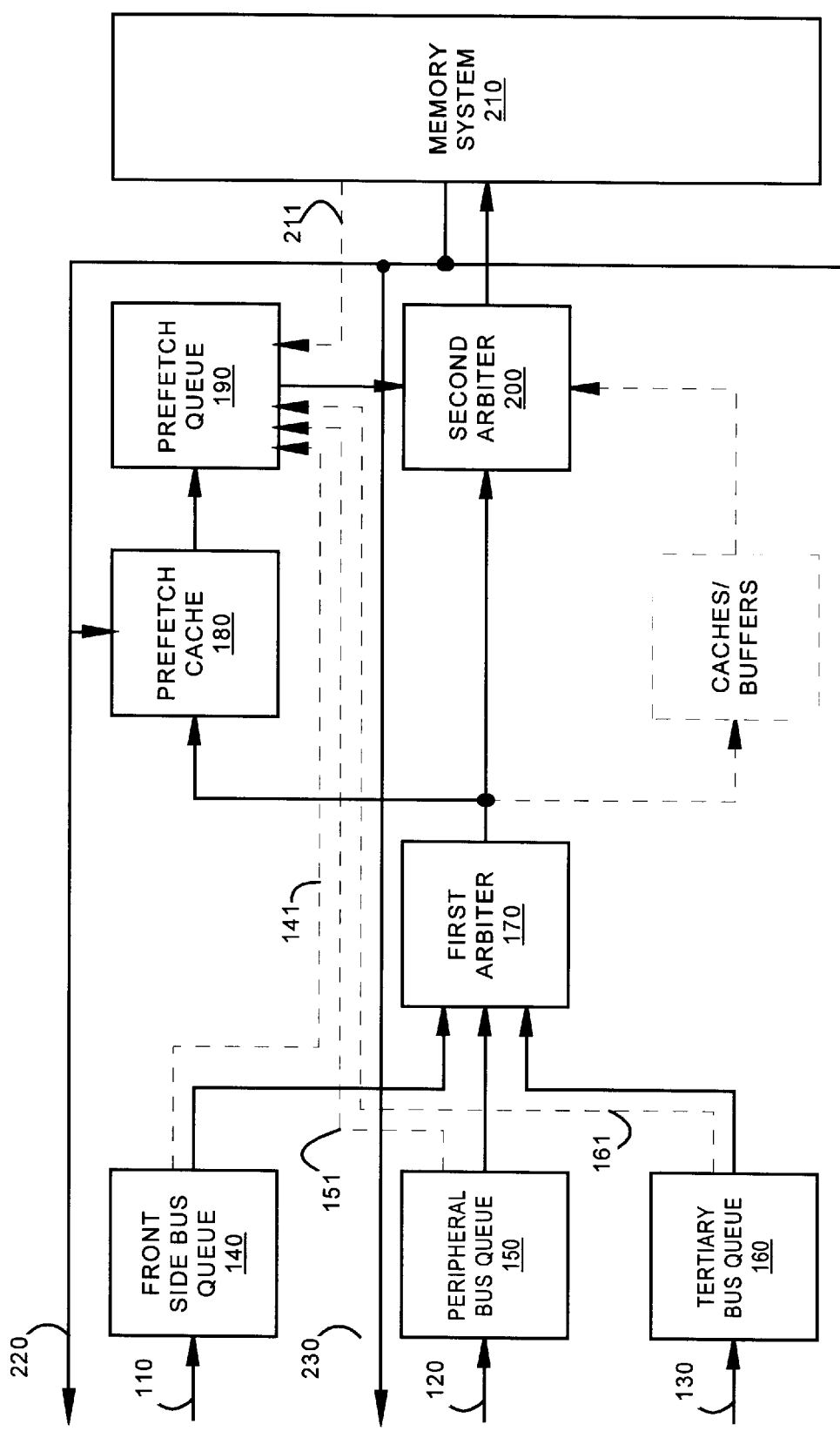
FIG. 1 is a block diagram of a memory controller constructed in accordance with an embodiment of the present invention.

FIG. 1 is a block diagram of a memory controller 100 according to an embodiment of the present invention. The memory controller 100 may be interconnected to a variety of different communication buses. Typically, the buses permit the memory controller 100 to communicate with other system agents, for example with microprocessors and peripheral devices. Data paths 110, 120 and 130 represent exemplary inbound data paths from a front side bus, a PCI bus and another tertiary bus respectively. The memory controller 100, of course, finds application with other types of communication buses.

The memory controller 100 may be populated by a plurality of transaction queues 140, 150 and 160. The transaction queues receive and buffer data requests from their respective communication buses 110, 120 and 130 for in order processing or possibly, out of order processing. Typical data requests include read requests and write requests. When a transaction advances out of its respective transaction queue 140, 150 or 160, it is presented to an arbiter 170.

The transaction queues 140–160 typically are not connected directly to their respective communication buses. As is known, each bus may operate according to its own bus protocol and topology. The memory controller 100 may include bus controllers and translators that operate in accordance with these protocols and topology and may normalize signals received therefrom into a uniform signal pattern for processing within the memory controller 100. Such additional controllers and translators are not shown in FIG. 1.

The arbiter 170 determines which of possibly many transactions will be granted. When it determines to grant a transaction, it notifies the transaction queue from which the granted transaction originated that the request was granted. The other transaction requests are denied, either explicitly though notification or implicitly through absence of a grant notification. Denied transactions are retried at a later time. For example, if all three transaction queues 140–160 output transaction requests to the arbiter 170 and the arbiter 170 selected the request from front side bus queue 140, it would signal the front side bus queue 140 that the request was granted and signal the other queues 150, 160 that their requests were denied. The arbiter 170 outputs a data signal representing the granted request.

The memory controller may be populated by a prefetch cache 180 and a prefetch queue 190. The prefetch cache 180 monitors signals output from the arbiter 170 to determine whether to issue a prefetch request. If a prefetch request is issued, it is output to the prefetch queue 190. The prefetch cache 180 also may store data that was stored in response to a previous prefetch request. If the arbiter 170 issues a request for data that is stored in the prefetch cache 180, the prefetch cache outputs the requested data to satisfy the request.

The prefetch queue 190 is another transaction queue that buffers prefetch requests from the prefetch cache 180. Prefetch requests that advance out of the prefetch queue 190 are input to a second arbiter 200. In a manner similar to the first arbiter 170, the second arbiter selects one of possibly many input requests and denies the remainder. The second arbiter 200 may receive requests from the first arbiter 170, the prefetch queue 190 and other caches or queues within the memory controller 110. The selected request is output to the memory array 210. The remainder are denied and retried.

The memory controller 100 includes output data paths 220, 230, 240 to the various communication buses. Both the memory array 210 and the prefetch cache 180 may place data on the output data paths. As with the input data paths 110–130 the output data paths 220–240 may communicate with components within the memory controller to format output signals in accordance with the bus protocols and topologies of the various communication buses to which the memory controller 100 is connected.

As is known, prefetching generally causes data to be read from memory and cached in advance of its being made subject to a request from an agent that actually would process the data. According to an embodiment of the present invention, the prefetch cache 180 operates in accordance with one or more predetermined prefetching algorithms. Prefetching algorithms are well known per se.

According to an embodiment of the present invention, the prefetch queue 190 may be provided in communication with each of the transaction queues 140–160 for the purpose of determining whether the transaction queues are operating in a congested state. Each transaction queue may possess control logic (not shown), such as a state machine, adapted to determine how many requests are stored in the respective transaction queue and have not yet been granted by the first arbiter 170. Further, the control logic may be adapted to signal the prefetch queue 190 over a communication line (shown as 141 for FSB queue 140) when the number of pending transactions in the respective queue exceeds a predetermined limit.

In this alternate embodiment, the prefetch queue 190 also may possess control logic (not shown) that disables the prefetch queue 190 from posting requests to the second arbiter 200 when one of the transaction queues 140–160 signals the prefetch queue over the communication lines 141–161. Similar signals may come from the memory array shown as 211 for memory array 210.

In a further alternate embodiment, the communication lines 141–161 from respective transaction queues maybe input to the second arbiter 200 rather than to the prefetch queue 190 (connection not shown). In this embodiment, the second arbiter 200 may be adapted to disregard requests received from the prefetch queue 190 when it is so signaled by a congested transaction queue 140–160.

The introduction of congestion control signaling between the transaction queues 140–160 and the prefetch queue 190 or the second arbiter 200 (depending upon the embodiment) disables prefetching when a transaction queue (e.g. 140) is operating in congested state. By implication, prefetching may be performed during times when the transaction queues 140–160 experience relatively light loading conditions. During these light loading times, the otherwise unallocated bandwidth between the memory controller 100 and the memory array advantageously may be used.

According to an embodiment of the present invention, the prefetch queue 190 may be implemented as a last-in-first-out (LIFO) queue or as a first-in-first-out (FIFO) queue. The particular implementation of the prefetch queue typically will be determined by the prefetching algorithms that are integrated into the memory controller 100. This is a function of workload as well. For example, when multiple prefetch requests are in process, some prefetching techniques may prioritize a most recently issued request. In such a case, the prefetch queue 190 may be implemented as a LIFO queue. Other prefetching techniques may prioritize an oldest prefetch request. In this case, the prefetch queue 190 may be implemented as a FIFO queue. Both are consistent with the principles of the present invention.

Figure 2:
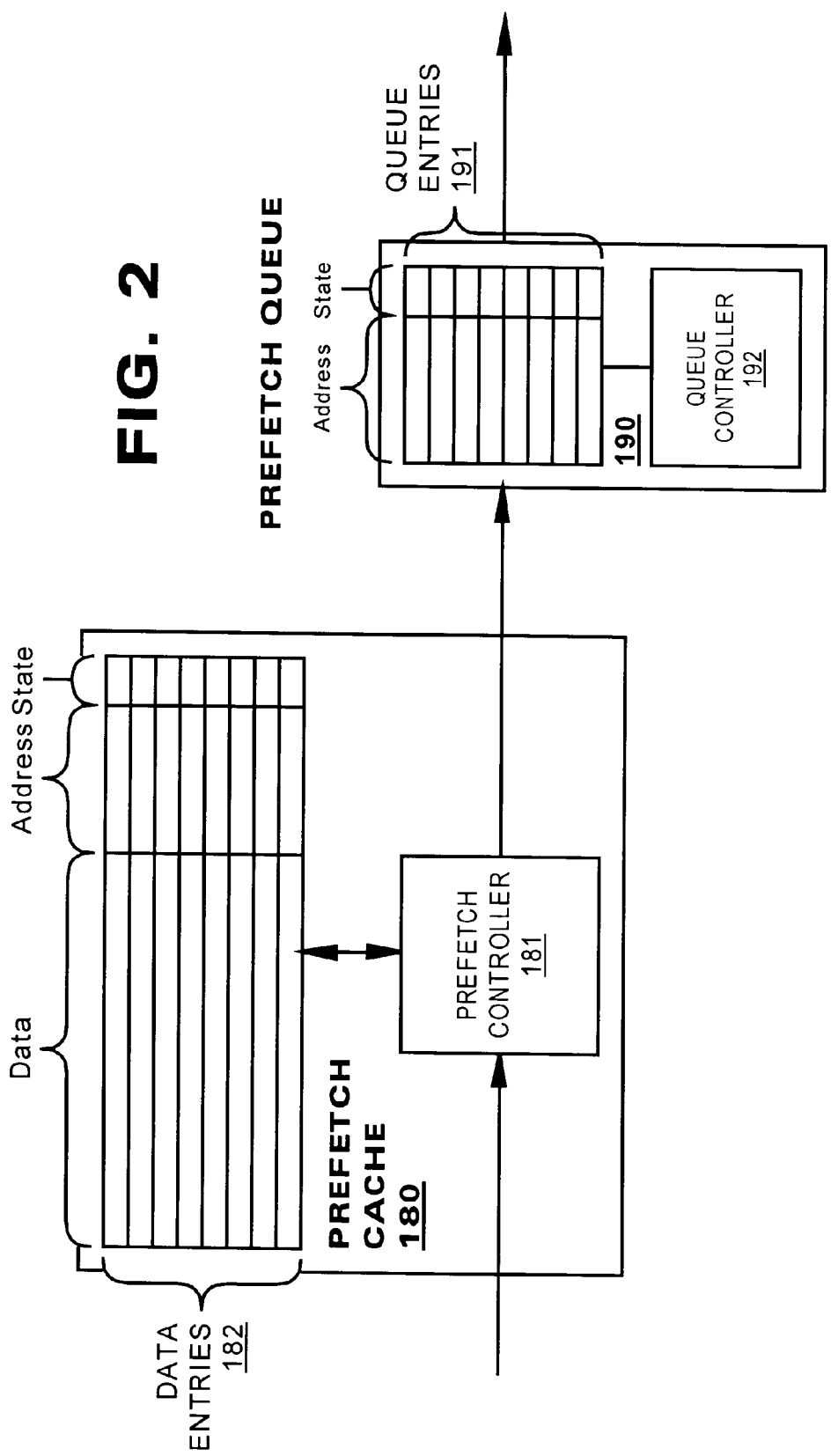
FIG. 2 is a block diagram of a prefetch cache and a prefetch queue constructed in accordance with an embodiment of the present invention.

FIG. 2 is a block diagram of a prefetch cache 180 and a prefetch queue 190 constructed in accordance with an embodiment of the present invention. The prefetch cache 180 may be populated by a prefetch controller 181 and a plurality of cache entries 182. The prefetch controller 181 receives signals output from the first arbiter 170. It also outputs prefetch requests to the prefetch queue 190.

The cache entries 182 store data that has been stored according to earlier prefetch requests. Each cache entry is associated with an ID. The cache entries store not only the data itself, but also may include fields for storage of an address of the data. The address field of the cache entries may include a content addressable memory (CAM).

The prefetch queue 190 also may include a plurality of queue entries 191. Each queue entry may include a content addressable memory (CAM) and an ID field. The prefetch queue 190 may be implemented as a first in, first out queue (FIFO) or as a last in, first out queue (LIFO) as may be desired.

Prefetch requests issued by the prefetch controller 181 identify an address from which data is to be prefetched and the ID of the cache entry 182 into which the prefetched data is to be stored. The prefetch queue 190 stores the address and ID information. When the prefetch request advances out of the prefetch queue 190, the prefetch queue 190 posts the address and ID information to the second arbiter 200 (FIG. 1). The memory array 210 retrieves the requested data according to conventional techniques. Control circuitry (not shown) in the memory controller 100 causes the prefetched data to be stored in the cache entry 182 identified in the prefetch request.

Figure 3:
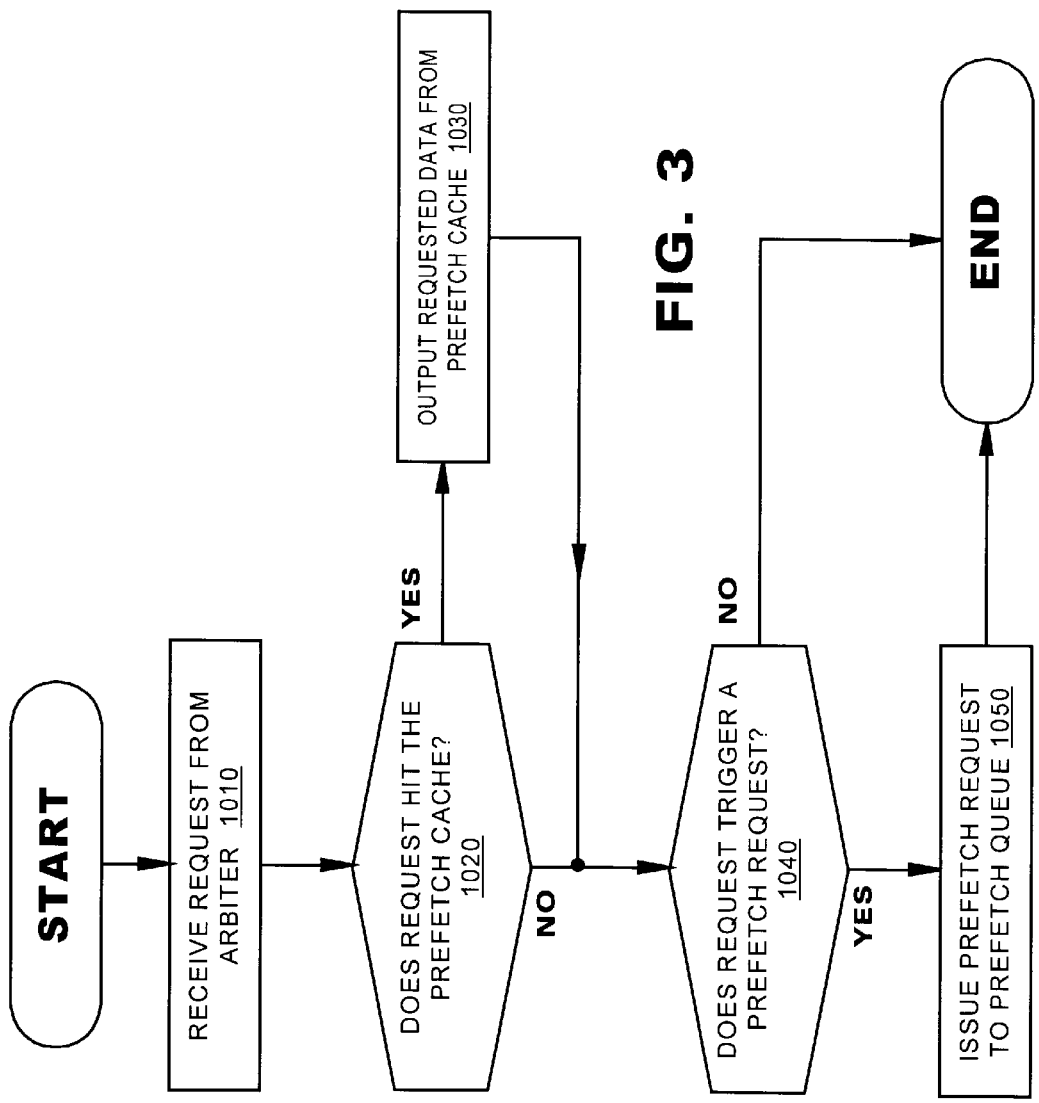
FIG. 3 is a flow diagram of a method according to an embodiment of the present invention.

FIG. 3 illustrates a method of operation of the prefetch controller 181 according to an embodiment of the present invention. The prefetch controller 181 monitors requests that are output from the first arbiter 170 (Step 1010). It determines whether requests from the arbiter 170 "hit" or "miss" the prefetch cache 180 (Step 1020). Requests "hit" the prefetch cache 180 when a prefetch cache entry 182 stores data requested by the data request. Otherwise, the request misses the prefetch cache 180. If the request hits the prefetch cache 180, the prefetch controller causes the data to be read from the prefetch cache 180 in response to the request (Step 1030). In this event, the data is output from the memory controller over an appropriate one of the output data paths 220–240.

If the request misses the cache or after the conclusion of step 1030, the prefetch controller 181 determines whether the request triggers a prefetch request (Step 1040). If so, then the prefetch controller 181 issues a prefetch request to the prefetch queue 190. Processing for the request issued by the arbiter 170 then terminates.

Returning to FIG. 2, according to an embodiment of the present invention, cache entries 182 may include a state field. According to this embodiment, data in each cache entry 182 may advance through the following four states:

"Invalid" indicates that the cache entry 182 does not store valid data. If a cache entry 182 is designated as invalid, a request will not be considered to hit the prefetch cache 180 even if the address of the request matches the address stored in the cache entry 182 so marked.

"Prefetch issued" indicates that the cache entry 182 does not store valid data but that a prefetch request has been issued to the address stored in the address field of the cache entry 182 and that the prefetch request is pending in the prefetch queue.

"Pending" indicates that the cache entry 182 does not store valid data but that a prefetch request has been issued for the address stored in the address field and that the prefetch queue 190 has "launched" the request (the request was issued to and granted by the second arbiter 200).

"Valid" indicates that the cache entry 182 stores valid data.

Figure 4:
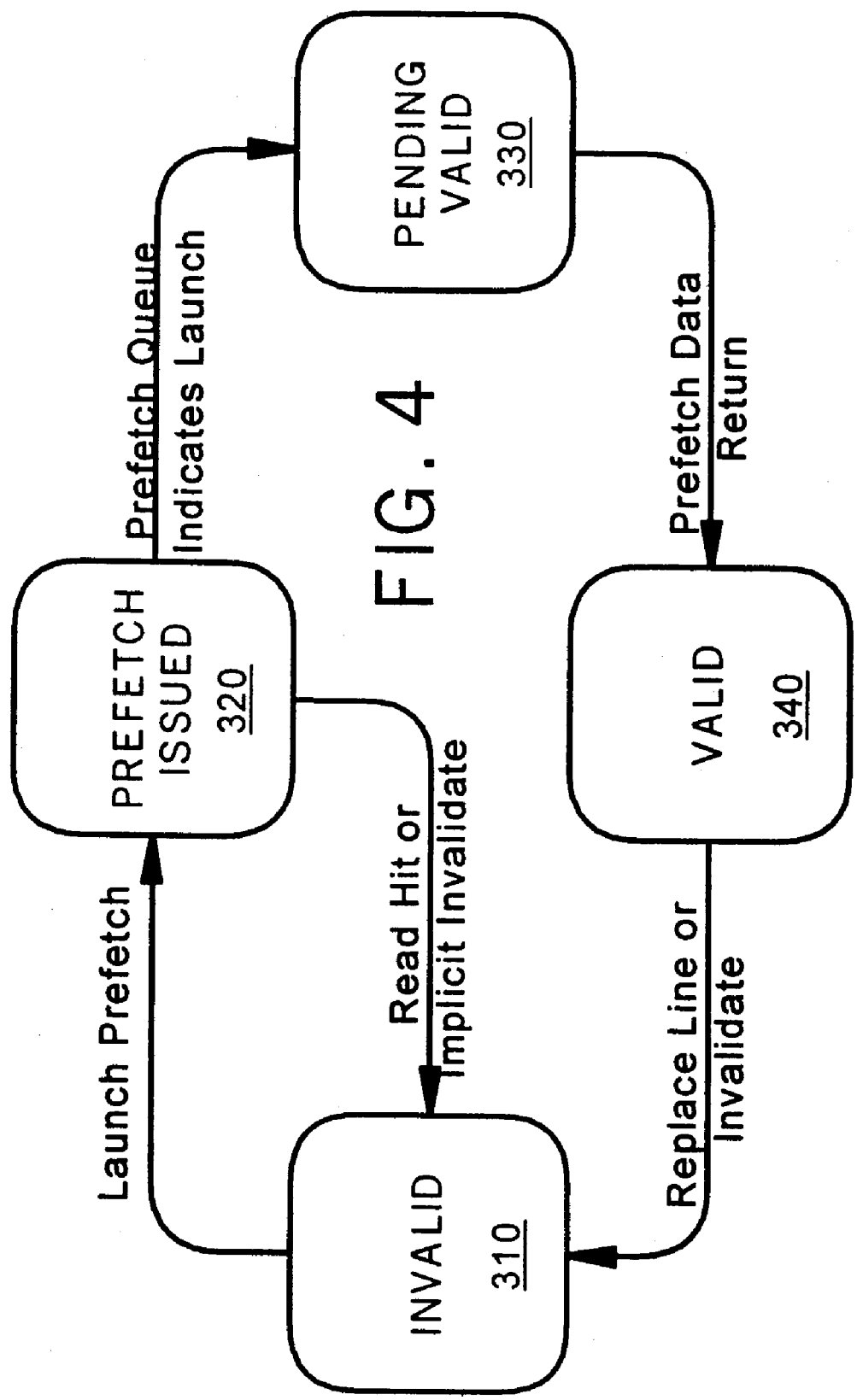
FIG. 4 is a state diagram according to an embodiment of the present invention.

FIG. 4 is a state diagram illustrating, in accordance with an embodiment of the present invention, how data in a cache entry 182 may advance through the states. Initially, prior to storing valid data stored in the cache entry 182, the data is marked as invalid 310. When the prefetch controller issues a prefetch request, it assigns a cache entry 182 as the destination of the data to be prefetched and marks the state of the cache entry 182 as prefetch issued 320. When the prefetch request is issued by the prefetch queue 190 (FIG. 1) and granted by the second arbiter 200, the prefetch queue 190 so notifies the prefetch controller 181. The prefetch controller 181 marks the state of the associated cache entry 182 as pending 330. When the prefetched data is returned by the memory array 210 and stored in the cache entry 182, the prefetch controller 181 marks the state of the cache entry 182 as valid 340.

The state of a cache entry is marked as prefetch issued 320 when the prefetch request is stored in the prefetch queue 190 and before the second arbiter 200 has granted it. It is possible that the arbiter 170 may grant a request from one of the transaction queues 140–160 directed to the same address as is used in the prefetch request. According to an embodiment of the present invention, if this occurs while the cache entry 182 is marked as prefetch issued, the prefetch controller 181 may mark the entry 182 as invalid 310.

Figure 5:
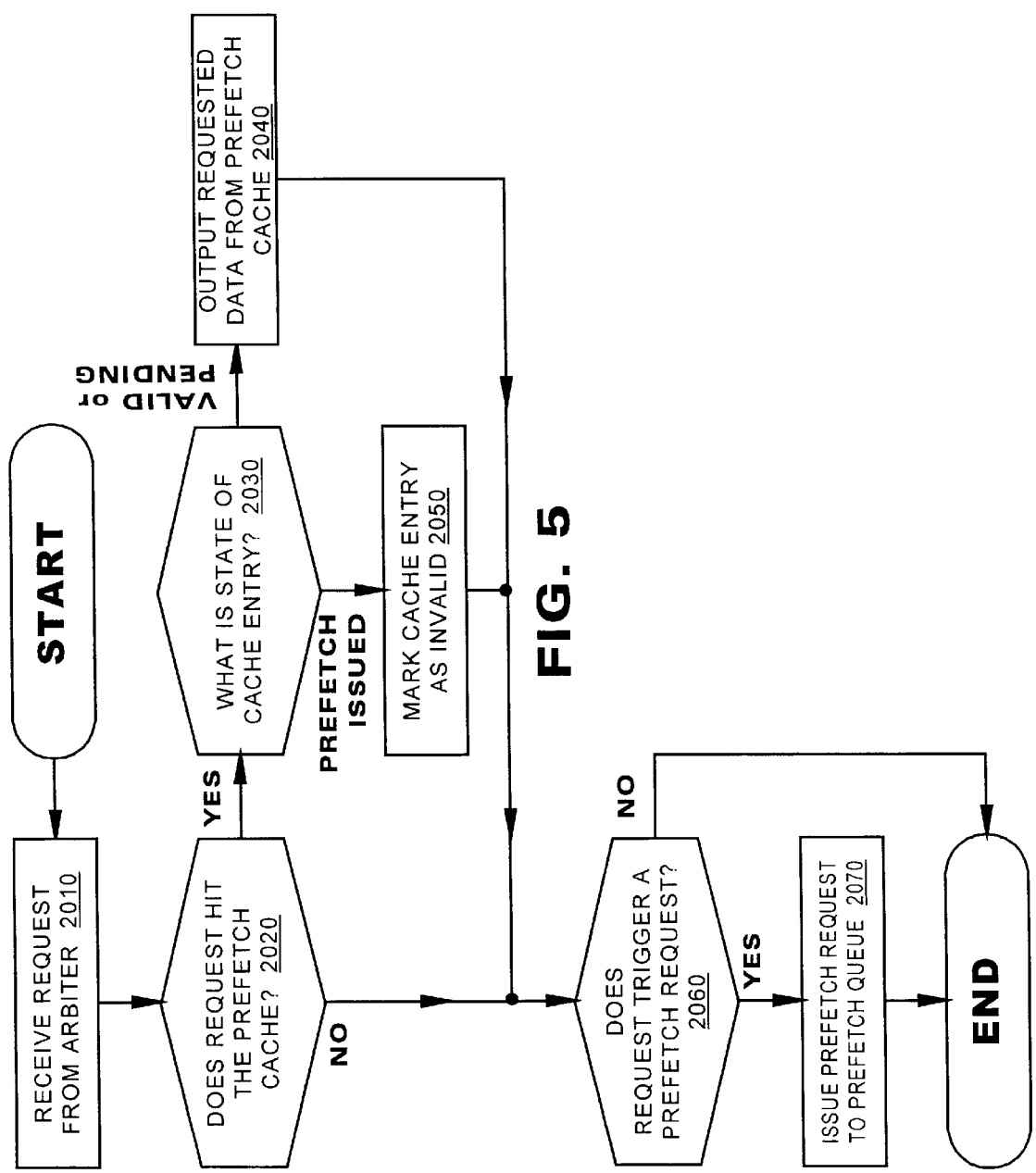
FIG. 5 is a flow diagram of a method according to another embodiment of the present invention.
Figure 6:
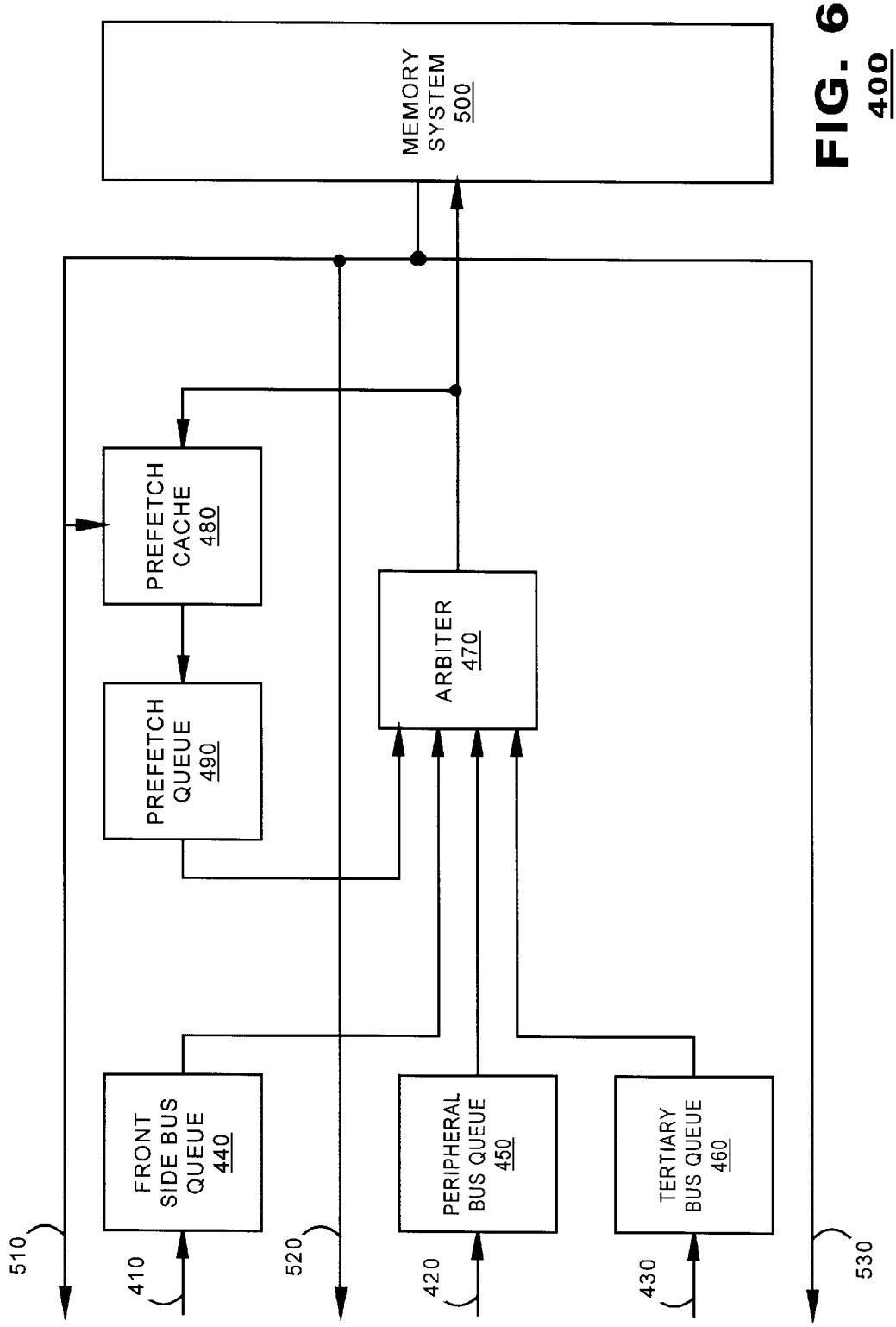
FIG. 6 is a block diagram of a memory controller constructed in accordance with another embodiment of the present invention.

According to an alternate embodiment of the present invention, the prefetch controller 181 may operate in accordance with the method of FIG. 5. The method begins when the prefetch controller 181 receives a request granted by the first arbiter 170. (Step 2010) The prefetch controller 181 determines whether the request hits the prefetch cache 180 (Step 2020). If the request hits the cache, the prefetch controller 181 retrieves the state from the matching cache entry 182. If the state is valid or pending, the prefetch controller will cause data to be output from the prefetch cache 180 in satisfaction of the request (Step 2040). Data may be output from the prefetch cache 180 immediately for data that is marked valid; the data will be stored already in the cache entry 182. For data marked as pending, the prefetch controller 181 waits until the prefetch request completes, the data is stored in the cache entry 182 and the state advances to valid before it outputs data from the cache entry 182. If in Step 2030, the state is marked as prefetch issued, the prefetch controller causes the state to be marked as invalid (Step 2050).

If at step 2020 the request misses the cache or at the conclusion of step 2040 or step 2050, the prefetch controller 181 determines whether the request triggers a prefetch request (Step 2060). If so, the prefetch controller 181 issues a prefetch request to the prefetch queue 190 (Step 2070). If not, or at the conclusion of step 2070, the method may conclude.

Several embodiments of the present invention are specifically illustrated and described herein. However, it will be appreciated that modification and variations of the present invention are covered by the above teachings and within the purview of the appended claims without departing from the spirit and intended scope of the invention.

We claim:

1. A memory controller, comprising:
   an arbiter adapted to receive data requests from an input path,
   a prefetch cache in communication with the arbiter, and
   a prefetch queue in communication with the prefetch cache, the prefetch queue being disabled in response to congestion on the input path.

2. The memory controller of claim 1, wherein an output of the prefetch queue is input to the arbiter.

3. The memory controller of claim 1, further comprising a second arbiter provided in a communication with the first arbiter and with the prefetch queue.

4. The memory controller of claim 1, wherein the prefetch cache comprises:
   a prefetch controller in communication with the arbiter and the prefetch queue, and
   a plurality of cache entries.

5. The memory controller of claim 4, wherein each cache entry comprises:
   a data field for storage of data, and
   an address field for storage a memory address associated with the data.

6. The memory controller of claim 5, wherein each cache entry further comprises a state field.

7. The memory controller of claim 1, wherein the prefetch queue is a FIFO queue.

8. The memory controller of claim 1, wherein the prefetch queue is a LIFO queue.

9. A memory controller system comprising the memory controller of claim 1 in communication with a memory array.

10. A memory controller, comprising:
    input and output data paths associated with a communication bus,
    a first arbiter in communication with the input data path,
    a prefetch cache in communication with the first arbiter, the prefetch cache also in communication with the output data path,
    a prefetch queue in communication with the prefetch cache, and
    a second arbiter in communication with the first arbiter and the prefetch queue.

11. The memory controller of claim 10, wherein the prefetch cache comprises:
    a prefetch controller in communication with the arbiter and the prefetch queue, and
    a plurality of cache entries in communication with the output data path.

12. The memory controller of claim 11, wherein the cache entries are provided with content addressable logic, the logic in communication with the prefetch controller.

13. The memory controller of claim 12, wherein the content addressable logic is provided in an address field of the cache entries.

14. The memory controller of claim 12, wherein the content addressable logic is provided in a state field of the cache entries.

15. The memory controller of claim 10, wherein the prefetch queue comprises a plurality of queue entries.

16. The memory controller of claim 10, wherein the prefetch queue is a FIFO queue.

17. The memory controller of claim 10, wherein the prefetch queue is a LIFO queue.

18. A memory controller system comprising the memory controller of claim 10 provided in communication with a memory array.

19. A method of processing data requests in a memory controller, comprising:

in absence of congestion at an external transaction queue, issuing a prefetch request, storing an address of data to be prefetched in a cache entry and marking a state of the cache entry as prefetch issued.

20. The method of claim 19, further comprising, thereafter, if a data request is received that includes the address of the data to be prefetched, marking the state as invalid.

21. The method of claim 19, further comprising receiving a signal indicating that the prefetch request has been posted and marking the state as pending.

22. The method of claim 19, further comprising storing the data to be prefetched in the cache entry and marking the state as valid.

23. An opportunistic memory controller, comprising:
a transaction queue, one provided in association with each bus of the memory controller, each having a congestion indicator output,
an arbitration system coupled to the transaction queues, and
a prefetch system coupled to the arbitration system, the prefetch system being disabled in response to a predetermined state of one of the congestion indicator outputs.

24. The memory controller of claim 23, wherein the arbitration system comprises:
a first arbiter coupled to the transaction queues, and
a second arbiter coupled to the first arbiter and to the prefetch system.

25. The memory controller of claim 24, wherein the prefetch system comprises:
a prefetch cache in communication with the first arbiter, and
a prefetch queue in communication with the prefetch cache and the second arbiter.

26. The memory controller of claim 24, wherein the second arbiter denies requests from the prefetch system in response to the predetermined state.

27. A method of processing data requests in a memory controller, comprising:
in response to the data request, determining whether the request hits a prefetch cache,
if the request misses the prefetch cache, determining whether the request hits a prefetch queue,
if the request hits the prefetch queue, canceling the request in the prefetch queue.

28. The method of claim 27, further comprising, when the request misses the prefetch cache, applying the request to a memory array.

29. The method of claim 27, wherein the request misses the prefetch cache even when a match occurs between an address of the request and an address stored in the prefetch cache, provided an associated state indicates either an invalid state or a prefetch issued state.

30. The method of claim 27, wherein the request hits the prefetch cache when a match occurs between an address of the request and an address stored in the prefetch cache and when the state indicates either ana valid state or a prefetch pending state.

31. A prefetching method for a memory controller, comprising:
in response to an external request, determining whether the request hits a prefetch cache within the memory controller,
if so, retrieving an associated state identifier from the prefetch cache,
if the state identifier indicates that the prefetch cache does not store valid data responsive to the external request and that a prefetch request has been issued to the address, marking the state identifier as invalid.

32. The method of claim 31, further comprising, if the state identifier indicates that the prefetch cache stores valid data, satisfying the external request from the prefetch cache.

33. The method of claim 31, further comprising, if the state identifier indicates that a prefetch request to an address of the external request is pending, satisfying the external request from a response to the prefetch request.

34. The method of claim 31, further comprising, if the address misses the prefetch cache, directing the external request to a memory array.

35. A method of processing data requests in a memory controller, comprising:
storing incoming requests in a transaction queue;
if the number of requests stored in the transaction queue does not exceed a predetermined number:
issuing a prefetch request,
storing an address of data to be prefetched in a cache entry, and
marking a state of the cache entry as prefetch issued; and
if the number of requests stored in the transaction queue exceeds a predetermined number, disabling a prefetch queue from issuing a prefetch request to an arbiter.

36. The method of claim 35, wherein the number of requests stored in the transaction queue is the number of requests stored in the transaction queue that have not yet been granted by a first arbiter.

37. The method of claim 35, further comprising, thereafter, if a data request is received that includes the address of the data to be prefetched, marking the state as invalid.

38. The method of claim 35, further comprising receiving a signal indicating that the prefetch request has been posted and marking the state as pending.

39. The method of claim 35, further comprising storing the data to be prefetched in the cache entry and marking the state as valid.

* * * * *

UNITED STATES PATENT AND TRADEMARK OFFICE
CERTIFICATE OF CORRECTION

PATENT NO.    : 6,594,730 B1
DATED         : July 15, 2003
INVENTOR(S)   : Hum et al.

It is certified that error appears in the above-identified patent and that said Letters Patent is hereby corrected as shown below:

<u>Column 8,</u>
Line 4, change "either ana valid" to -- either a valid --.

Signed and Sealed this

Twentieth Day of July, 2004

JON W. DUDAS
*Acting Director of the United States Patent and Trademark Office*